United States Patent
Hojjati Emami et al.

(10) Patent No.: US 6,482,870 B1
(45) Date of Patent: Nov. 19, 2002

(54) CROSSLINK POLYETHYLENE OXIDE IN THE MELT BY MEANS OF 2,5-BIS(TERT-BUTYLPEROXY)-2,5-DIMETHYLHEXANE

(76) Inventors: Shahriar Hojjati Emami, 949 W. Adams Blvd., Apt. #2, Los Angeles, CA (US) 90007; Ronald Salovey, University of So. California, Dept. of Chem. Eng., Los Angeles, CA (US) 90089-1211

( * ) Notice: Subject to any disclaimer, the term of this patent is extended or adjusted under 35 U.S.C. 154(b) by 0 days.

(21) Appl. No.: 09/907,864

(22) Filed: Jul. 19, 2001

(51) Int. Cl.[7] ............................. C08F 2/46; C08G 65/34
(52) U.S. Cl. ..................... 522/60; 528/425; 528/503; 522/74; 522/100; 522/179
(58) Field of Search ................... 528/425, 503; 522/60, 74, 100, 179

(56) References Cited

U.S. PATENT DOCUMENTS

| | | | | |
|---|---|---|---|---|
| 3,264,202 A | * | 8/1966 | King | |
| 4,684,558 A | * | 8/1987 | Keusch et al. | 428/40 |
| 5,147,646 A | * | 9/1992 | Graham | 424/424 |
| 5,645,583 A | * | 7/1997 | Villain et al. | 623/5 |

* cited by examiner

Primary Examiner—Samuel A. Acquah

(57) ABSTRACT

A new method for crosslinking polyethylene oxide (PEO) by means of a dialkyl peroxide to form a gel, which can imbibe large amounts of water. Two separate ovens were used to crosslink PEO with the peroxide. The first oven is set at 85° C. for 2.5 minutes for melting the polymer and purging oxygen with acetone vapors and forming a shield around the sample to minimize oxygen diffusion from outside, meanwhile, trapping peroxides inside. A second oven was used to thermally decompose the peroxide. The crosslinking reaction proceeds at 160° C. for 15 minutes.

1 Claim, No Drawings

CROSSLINK POLYETHYLENE OXIDE IN THE MELT BY MEANS OF 2,5-BIS(TERT-BUTYLPEROXY)-2,5-DIMETHYLHEXANE

CROSS-REFERENCE TO RELATED APPLICATIONS

Not Applicable

BACKGROUND—FIELD OF INVENTION

This invention relates generally to a method for producing a polyethylene oxide network, by using a Dialkyl Peroxide, which can swell in water to form a hydrogel and absorb large amount of water.

BACKGROUND—DESCRIPTION OF PRIOR ART

Crosslinking of PEO was first reported by researchers at Union Carbide, U.S. Pat. No. 3,264,202, in Aug. 2, 1966. Crosslinking had been brought about by gamma radiation of dilute aqueous solutions of PEO. Later, methods based on chemical crosslinking via hydroxyl end groups in PEO was suggested by Gnanou et al, Macromolecules, 17, 945 (1984). Recently, Doytcheva et al, reported crosslinking of PEO by ultraviolet irradiation, J. Appl. Polym Sci 64, 2299 (1997). Crosslinking of PEO by gamma radiation was restricted to dilute aqueous solutions, almost 0.8 to 8% PEO by weight, although higher values also are reported (U.S. Pat. No. 5,645,583). Crosslinking in bulk required more than 100 Mrad dosage, which is impractical. This way of network formation is not very attractive for large production rates for super absorbent technology like baby diapers or hygienic products.

Moreover, crosslinking by ultraviolet radiation is restricted to very thin layers, as thin as 160–250 micrometer, and that is also not applicable for high production rates or thick layers.

SUMMARY OF THE INVENTION

It is therefore an object of the present invention to provide a process for producing a hydrogel by peroxide crosslinking of polyethylene oxide.

Another object of this invention is to provide a chemical method for crosslinking of PEO that is cheap and easy for large scale production.

A further object of the present invention is to provide a highly swollen gel which is very soft and can be used in superabsorbent technology or in biomedical applications, like wound healing after purification and sterilization.

DETAILED DESCRIPTION OF THE PREFERED EMBODIMENT

Polyethylene oxide is a synthetic polymer with highly flexible chains. This flexibility is due to the oxygen in the backbone, which also depresses the melting temperature.

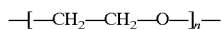

PEO is soluble in benzene, chloroform and water. Flexibility of the backbone provides a superior soft quality in super absorbent technology. Polyethylene oxide is an inert material and meets all of the requirements of strength, absorbency, flexibility and adhesiveness in bimaterial/biomedical applications (U.S. Pat. Nos. 4,684,558 and 5,645,583).

PEO powder (from Aldrich Company) at molecular weights M=100,000, 400,000 and 2000,000 was weighed (0.5 gr.) and transferred to dried vials (18 ml). The crosslinking agent is a liquid, 2,5-Bis(tert-butylperoxy)-2,5-dimethylhexane, Luperox 101 (purity>90%) or $[(CH_3)_3COOC-(CH_3)_2CH_2-]_2$, from AtoFina Chemicals and was mixed with acetone and diluted to 3, 10 and 30% (by volume).

One ml of prepared solution was transferred to vials (with a 5 ml Pipette) containing PEO. Each molecular weight of PEO was mixed with 3 different concentrations of crosslinking agent. Polymer and Luperox solution was stirred with a glass rod until the entire polymer was completely dispersed. Samples were left under the hood to allow excess acetone to evaporate. After about 20 minutes, excess acetone was evaporated, and wet samples were transferred to the an oven. Two ovens were used during this experiment, the first oven was adjusted to 85° C. to melt samples below the decomposition temperature of peroxide and the second one was adjusted to 160° C. for crosslinking reaction. Temperature was measured by a thermometer inside each oven. Vials were located beside the thermometers to minimize any error due to the temperature variation. Samples were kept for 2.5–5 minutes in the first oven, to melt PEO (melting temperature of PEO is 65° C.) and facilitate diffusion of peroxide radicals inside polymer particles. During this time samples with molecular weights 100,000 and 400,000 gradually changed in color from white to glassy opaque. Samples with molecular weight 2,000,000 start to shrink but their color didn't change significantly. It seems that 2–5 minutes is enough to melt PEO. The major role of the first oven is to evaporate extra acetone that still remained in the sample and consequently purging the sample to remove oxygen which can act as a scavenger. Also make a "shield" to protect polymer chains from diffusion of oxygen from outside. After a specified time, vials were transferred quickly to the second oven. Vials were kept for 15 min at 160° C. to let the crosslinking reaction occur. The Half-life is one hour at 140° C. and 10 hour at 120° C. for luperox 101. The decomposition rate is first order and is characterized by the following equation where C=peroxide concentration, t=time and K=rate constant.

$$-dC/dt=KC$$

For convenience in comparing the stability of peroxides in dilute solutions, peroxides are commonly listed according to the temperatures at which they have half-lives of 10 hrs. The higher the temperature corresponding to the 10 hr half-life, the more stable the peroxide. Luperox 101 is a Dialkyl Peroxide and Table 1 offers more data about this peroxide.

TABLE 1

Data sheet for Luperox 101 (AtoFina organic peroxides).

| General Formula | Chemical Name (CAS Registry) | New Trade Name | 10 hr. T1/2C | 1 hr. T1/2C | % Active Oxygen (by Weight) | Description |
| --- | --- | --- | --- | --- | --- | --- |
| $(R-OO)_nR'$ n = 1 or 2 | 2,5-Dimethyl-2,5-di-(ti-Buthylperoxy)hexane (78-63-7) | Luperox 101 (Lupersol 101) | 120 | 140 | 10.03–10.25 | 91–93% Liquid |

Water was added to vials after 15 min in the second oven. Crosslinked polymers gradually absorbed water and expand. Swollen networks were transferred to the beakers and kept for 72 hours to dissolve the sol parts or uncrosslinked portions. Aqueous solvent was replaced by fresh water every day. Excess water was removed by a Teflon sieve with a hook. Napkins under the sieves were used to wipe out leaching water.

Samples were dried slowly under the hood with an aluminum cover for a 2–5 days. Drying is of utmost importance and slow drying is necessary to avoid collapsing the networks. Swelling ratio and gel content are defined as the weight of swollen gel divided by dry gel and weight of dry networks divided by original weight of samples (0.5 gr in this experiment) multiplied by 100 to give percent, respectively. Although we have tried to dry samples as slow as possible, the final results maybe affected by partially collapsing the samples during course of drying. There is a possibility that by using novel ways of drying in the future, dry weights maybe increased. Table 2 shows swelling ratio and gel contents for prepared samples.

TABLE 2

Swelling ratio and gel contents for 3 different molecular weights.

| | Concentration of Luperox 101 in | | |
| --- | --- | --- | --- |
| Acetone | (3%) | (10%) | (30%) |
| Swelling ratio M = 2,000,000 | 68.44 | 32.07 | 20.79 |
| Gel content (%) | 37 | 50.4 | 56 |

TABLE 2-continued

Swelling ratio and gel contents for 3 different molecular weights.

| | Concentration of Luperox 101 in | | |
| --- | --- | --- | --- |
| Acetone | (3%) | (10%) | (30%) |
| Swelling ratio M = 400,000 | 87.22 | 25.14 | 18.79 |
| Gel content (%) | 26.42 | 56.86 | 63.42 |
| Swelling ratio M = 100,000 | 392 | 27.05 | 17.65 |
| Gel content (%) | 5 | 54 | 59 |

What is claimed is:

1. A method for crosslinking PEO with Dialkyl peroxide (Luperox 101) comprising the steps of:

dissolving dialkyl peroxide in acetone;

mixing dialkyl peroxide-acetone solution with PEO powder;

evaporating excess acetone of said mixture under the hood;

transferring the said mixture to the oven at 85° C. for 2.5–5 minutes;

transferring the said mixture to the another oven at 160° C. for 15 minutes to form a network;

and adding water to the said network to swell and form a hydrogel.

* * * * *